United States Patent
Terao (10) Patent No.: US 10,057,874 B2
(45) Date of Patent: Aug. 21, 2018

(54) COMMUNICATION APPARATUS, CONTROL METHOD OF COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Tsuyoshi Terao, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 15/063,892

(22) Filed: Mar. 8, 2016

(65) Prior Publication Data

US 2016/0286521 A1 Sep. 29, 2016

(30) Foreign Application Priority Data

Mar. 26, 2015 (JP) ................. 2015-064901

(51) Int. Cl.

| H04L 12/801 | (2013.01) |
|---|---|
| H04W 64/00 | (2009.01) |
| H04W 36/32 | (2009.01) |
| H04W 48/20 | (2009.01) |
| H04W 84/00 | (2009.01) |
| H04W 76/10 | (2018.01) |

(52) U.S. Cl.
CPC ......... *H04W 64/003* (2013.01); *H04W 36/32* (2013.01); *H04W 48/20* (2013.01); *H04W 64/006* (2013.01); *H04W 76/10* (2018.02); *H04W 84/005* (2013.01)

(58) Field of Classification Search
CPC ............ H04W 64/003; H04W 64/005; H04W 64/006; H04W 48/12; H04W 48/14; H04W 48/16; H04W 24/02; H04W 24/04; H04W 76/02; H04W 36/32
USPC .................................................. 370/254, 328
See application file for complete search history.

(56) References Cited

U.S. PATENT DOCUMENTS

| 9,712,974 | B2 * | 7/2017 | Wang ...................... G01S 11/10 |
| 9,832,702 | B2 * | 11/2017 | Shinada ................. H04W 36/32 |
| 2004/0137952 | A1 * | 7/2004 | Umesh .................... H01Q 1/246 |
|  |  |  | 455/562.1 |
| 2008/0146233 | A1 * | 6/2008 | Tsai ...................... H04W 36/32 |
|  |  |  | 455/437 |
| 2010/0150001 | A1 * | 6/2010 | Tsuchiya ........... H04M 1/72519 |
|  |  |  | 370/252 |
| 2012/0129528 | A1 * | 5/2012 | Kobayashi ........ H04W 36/0016 |
|  |  |  | 455/436 |

(Continued)

FOREIGN PATENT DOCUMENTS

| JP | 2007329680 A | 12/2007 |
| JP | 2014110450 A | 6/2014 |

*Primary Examiner* — Afsar M Qureshi
(74) *Attorney, Agent, or Firm* — Rossi, Kimms & McDowell LLP (57) ABSTRACT

A communication apparatus connectable to a wireless base station, the apparatus comprises a first obtaining unit configured to obtain a moving speed of the communication apparatus; a second obtaining unit configured to obtain a moving speed of the wireless base station; and a control unit configured to control connection to the wireless base station based on the moving speed of the communication apparatus and the moving speed of the wireless base station.

12 Claims, 6 Drawing Sheets

(56) References Cited

U.S. PATENT DOCUMENTS

| | | | | |
|---|---|---|---|---|
| 2014/0153485 A1* | 6/2014 | Tsuda | ................ | H04W 48/04 |
| | | | | 370/328 |
| 2014/0228057 A1* | 8/2014 | Uga | .................. | H04W 64/00 |
| | | | | 455/456.3 |
| 2014/0247806 A1* | 9/2014 | Fujimoto | ............ | H04W 64/006 |
| | | | | 370/331 |
| 2014/0335870 A1* | 11/2014 | Yilmaz | ............. | H04W 36/32 |
| | | | | 455/441 |
| 2014/0349658 A1* | 11/2014 | Lin | .................. | H04W 36/32 |
| | | | | 455/441 |

* cited by examiner

COMMUNICATION APPARATUS, CONTROL METHOD OF COMMUNICATION APPARATUS, AND NON-TRANSITORY COMPUTER-READABLE STORAGE MEDIUM

BACKGROUND OF THE INVENTION

Field of the Invention

The present invention relates to a communication apparatus, a control method of the communication apparatus, and a non-transitory computer-readable storage medium.

Description of the Related Art

In a wireless communication apparatus which performs communication by connecting to one wireless base station out of the plurality of base stations, there has been proposed a technique of selecting the preferred base station based on the moving state of the self apparatus.

Japanese Patent Laid-Open No. 2014-110450 has disclosed an apparatus which restricts a reselection process of a base station based on the moving state of the self apparatus. According to Japanese Patent Laid-Open No. 2014-110450, it is possible to reduce communication overhead by suppressing reselection process execution while the self apparatus moves at a high speed.

Furthermore, Japanese Patent Laid-Open No. 2007-329680 has disclosed an apparatus that connects to a wireless LAN access point (to be referred to as an AP hereinafter) present in a direction which forms a predetermined angle with respect to the moving direction of the self apparatus. According to Japanese Patent Laid-Open No. 2007-329680, it is possible to connect to the optimal AP which matches the moving direction of the self apparatus.

On the other hand, in recent years, there has prevailed a mobile terminal called a mobile router which has an AP function and a public wireless terminal function, and provides Internet connection to another wireless LAN station (to be referred to as an STA hereinafter). There has also appeared a provider which mounts the AP in a moving unit such as a train or a bus and provides a passenger with Internet connection via a public wireless LAN.

However, if the wireless base station to be connected in consideration of only the moving state of the self apparatus is selected, inappropriate selection may be made when the wireless base station is also moving. For example, if connected to the AP which is present in the moving direction of the self apparatus but moving in the opposite direction to the self apparatus, the distance between the self apparatus and the AP becomes larger as time goes by and a radio wave may not reach. As a result, communication is lost soon, causing a user inconvenience.

The present invention has been made in consideration of the above-described problems. The present invention provides a technique of reducing connection of the communication apparatus to the base station in an unstable communication state and improving connectivity.

SUMMARY OF THE INVENTION

According to one aspect of the present invention, there is provided a communication apparatus connectable to a wireless base station, the apparatus comprising: a first obtaining unit configured to obtain a moving speed of the communication apparatus; a second obtaining unit configured to obtain a moving speed of the wireless base station; and a control unit configured to control connection to the wireless base station based on the moving speed of the communication apparatus and the moving speed of the wireless base station.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

A case in which a wireless LAN system complying with the IEEE802.11 standard series is used will be described below. However, a communication mode is not necessarily limited to a wireless LAN complying with the IEEE802.11 standard.

First Embodiment

<1. Hardware Arrangement of Communication Apparatus>

Figure 1:
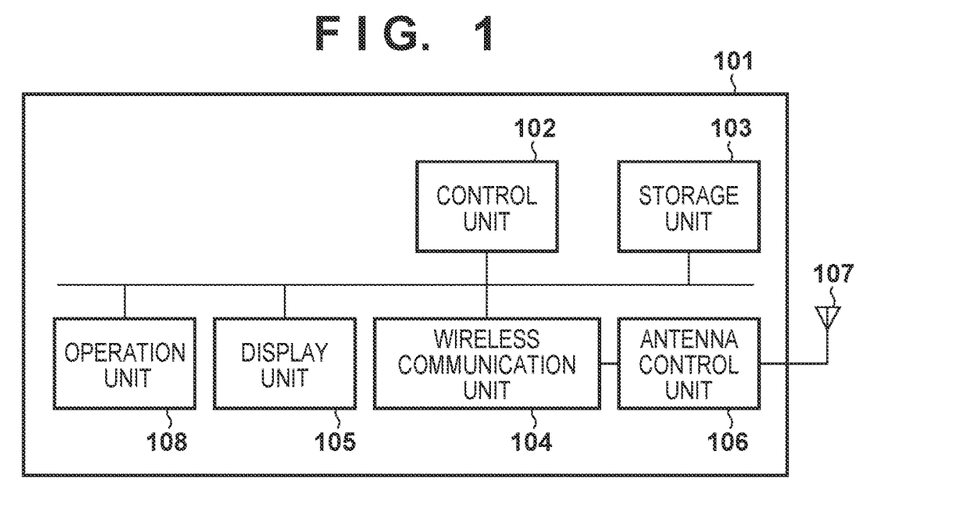
FIG. 1 is a block diagram showing an example of the hardware arrangement of a communication apparatus according to an embodiment of the present invention.

FIG. 1 is a block diagram showing an example of the hardware arrangement of a communication apparatus according to an embodiment of the present invention. Reference numeral 101 denotes a communication apparatus. A control unit 102 controls the entire communication apparatus by executing a control program stored in a storage unit 103 and includes a processor such as one or more CPUs. The control unit 102 also performs setting control of a communication parameter between the self apparatus and another apparatus. The storage unit 103 stores the control program executed by the control unit 102 and various kinds of information such as the communication parameter, and includes a memory such as one or more ROMs or RAMs. The operation of the communication apparatus shown in a flowchart to be described later is performed by causing the control unit 102 to execute the control program scored in the storage unit 103.

Reference numeral 104 denotes a wireless communication unit configured to perform wireless LAN communication complying with the IEEE802.11 standard series. A display unit 105 which performs various display operations has a function capable of outputting visually perceivable information like an LCD (Liquid Crystal Display) or an LED (Light Emitting Diode), or a function capable of outputting sound from a loudspeaker or the like. The display unit 105 has a function of outputting at least one of visual information and sound information.

Reference numeral 106 denotes an antenna control unit. Reference numeral 107 denotes an antenna. Reference numeral 108 denotes an operation unit configured to operate the communication apparatus 101 by causing a user to perform various input operations.

<2. Software Arrangement of Communication Apparatus>

Figure 2:
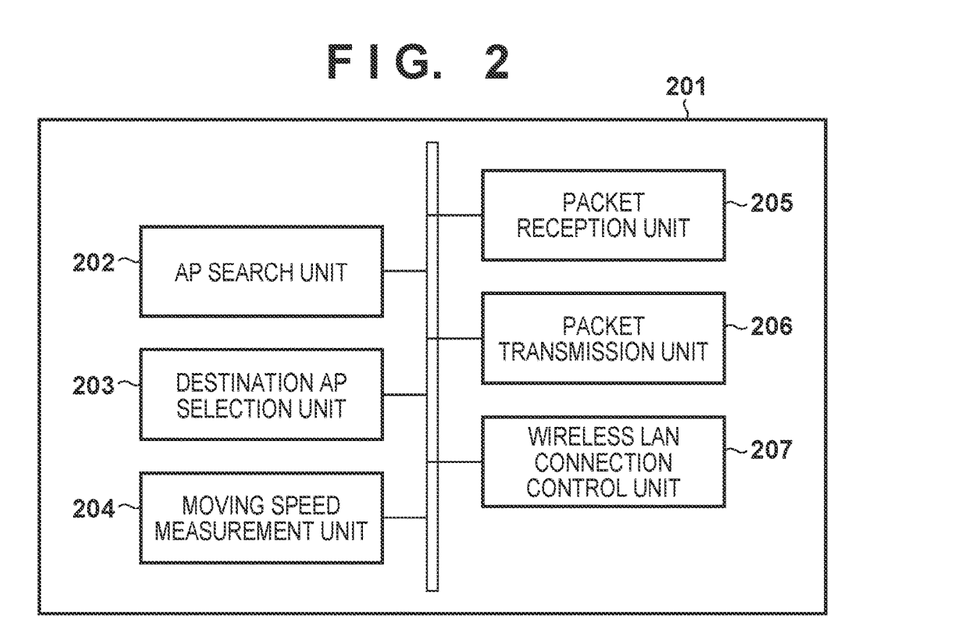
FIG. 2 is a functional block diagram showing an example of the software arrangement of the communication apparatus according to an embodiment of the present invention.

Next, FIG. 2 is a functional block diagram showing an example of the software arrangement of the communication apparatus according to an embodiment of the present invention. Reference numeral 201 denotes an overall software functional block of the communication apparatus 101. An AP search unit 202 has a function of transmitting a search signal to a peripheral wireless base station (AP) and receiving a response signal. The AP search unit 202 also has a function of detecting, from the received response signal, position information, the moving speed, the moving direction, and the like of the AP.

A destination AP selection unit 203 has a function of selecting a connection target AP based on information obtained as a result of AP search by the AP search unit 202. A moving speed measurement unit 204 has a function of detecting the moving speed of a self apparatus. Moving speed measurement is implemented by, for example, periodically obtaining the absolute position of the self apparatus by using a Global Positioning System (to be referred to as a GPS hereinafter), and estimating the moving speed and direction based on a history variation in the absolute position.

A packet reception unit 205 and a packet transmission unit 206 perform reception and transmission of all packets including a communication protocol of an upper layer. A wireless LAN connection control unit 207 has a function of connecting to the AP as an STA.

Note that all the functional blocks have a mutual relationship in a software or hardware manner. The aforementioned functional blocks are merely examples. A plurality of functional blocks may form one functional block, or any one of the functional blocks may be divided into a plurality of functional blocks.

<3. Network Configuration>

Figure 3:
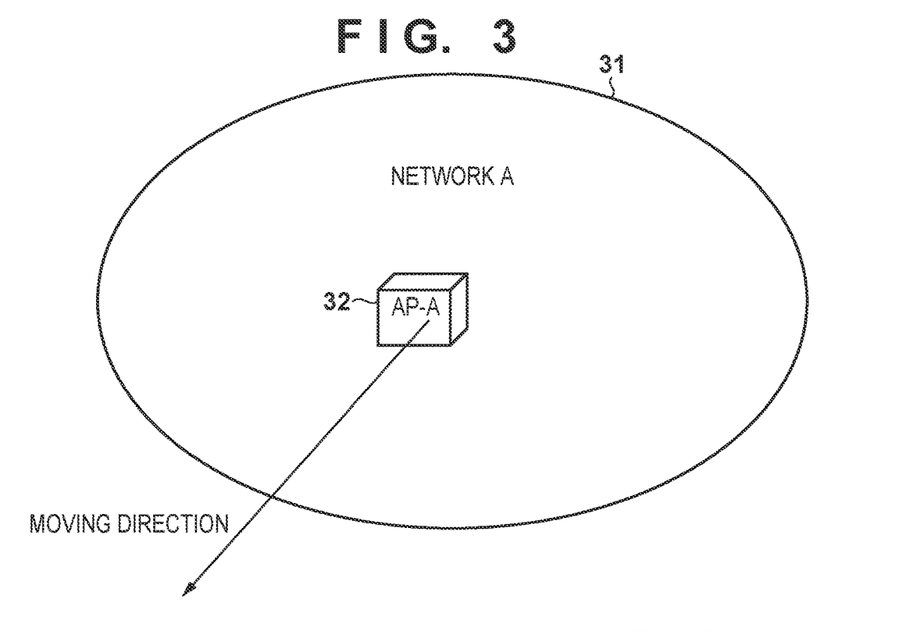
FIG. 3 is a view showing an example of the network configuration to which the first embodiment of the present invention is applied.

FIG. 3 is a view showing an example of the network configuration to which the first embodiment of the present invention is applied. FIG. 3 shows a network 31 (to be referred to as network A hereinafter) formed by an AP 32 (to be referred to as AP-A hereinafter). AP-A moves following a moving unit or the like. In addition, AP-A has a function of giving moving speed information of the self apparatus to the beacon, the probe response, or the like of the wireless LAN, and notifying the communication apparatus 101. For example, AP-A is configured to give a Location Parameter information element specified by the IEEE802.11 standard to the probe response or the beacon, and to notify another station of position information and moving speed information.

<4. Processing of Communication Apparatus>

Figure 4:
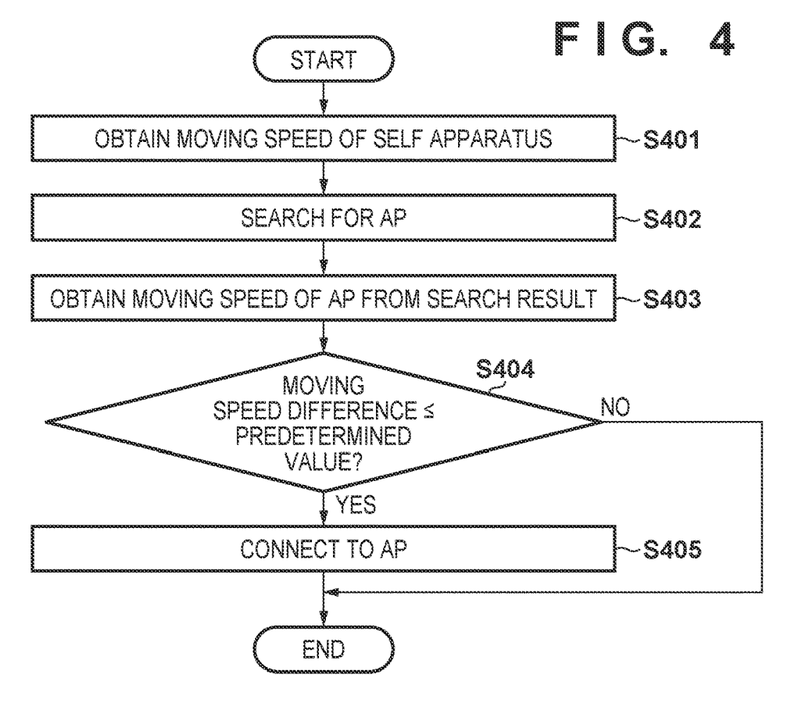
FIG. 4 is a flowchart showing a process procedure executed by the communication apparatus according to the first embodiment of the present invention.

Connection processing in which the communication apparatus 101 decides whether to connect to the AP depending on the moving speed of the self apparatus and the moving speed of the AP will be described below. FIG. 4 is a flowchart showing a process procedure executed by the communication apparatus (STA) which implements this first embodiment.

First, the communication apparatus 101 (STA) obtains the moving speed of the self apparatus by using the moving speed measurement unit 204 (step S401) once connection processing is started. Next, the communication apparatus 101 (STA) searches for the AP (step S402). More specifically, the communication apparatus 101 (STA) obtains AP information by transmitting a probe request to the AP and receiving a probe response transmitted by the AP in response to this. Then, the communication apparatus 101 (STA) obtains the moving speed of the AP from a search result in step S402 (step S403). For example, the communication apparatus 101 (STA) obtains the moving speed in the horizontal direction (Horizontal Speed) and the moving direction (Bearing) by referring to a Motion sub-information element in a Location Parameters information element contained in the probe response received from the AP in step S402.

Then, the communication apparatus 101 (STA) compares the moving speed of the self apparatus obtained in step S401 with the moving speed of the AP obtained in step S403 and determines whether that difference is equal to or smaller than a predetermined value (step S404). For example, if each of the moving speed of the self apparatus and the moving speed of the AP is expressed as a vector and the norm of that difference vector (that is, a relative speed) is equal to or smaller than the predetermined value, the communication apparatus 101 (STA) may be configured to determine that a speed difference is equal to or smaller than the predetermined value. If the communication apparatus 101 (STA) determines that the speed difference is equal to or smaller than the predetermined value (Yes in step S404), it attempts to connect to the AP by using the wireless LAN connection control unit 207 (step S405). On the other hand, if the communication apparatus 101 (STA) determines that the speed difference is equal to or larger than the predetermined value (No in step S404), it does not attempt to connect to the AP.

Note that if the communication apparatus 101 (STA) cannot obtain the moving speed of the AP for the reason that, for example, the probe response does not contain the information element in step S403, it may be configured to decide that the AP is at a standstill. Processing in FIG. 4 thus ends.

<5. Operation Sequence>

Figure 5:
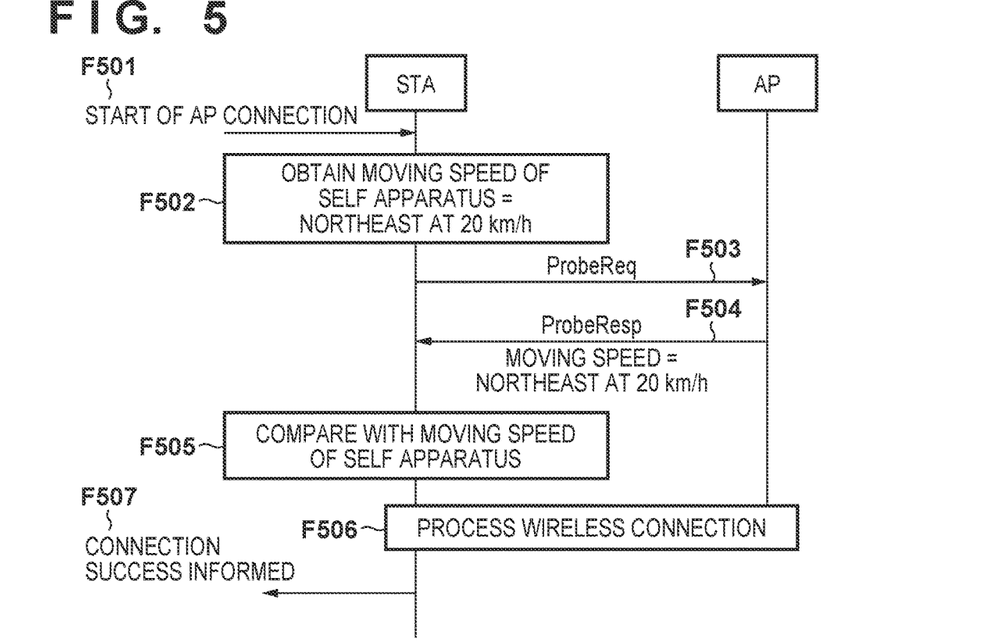
FIG. 5 is the first operation sequence chart according to the first embodiment of the present invention.

FIG. 5 is the first schematic chart showing an operation sequence when the communication apparatus connects to the AP according to this embodiment. In this example, both of the communication apparatus 101 (STA) and the AP move in the northeast direction at 20 km/h and are on the condition that preferred connection can be maintained.

The communication apparatus 101 (STA) receives a wireless LAN connection start instruction from the user (F501). The communication apparatus 101 (STA) that has received the wireless LAN connection start instruction obtains the moving speed of the self apparatus (F502). As a result of obtainment, it is found that the communication apparatus 101 (STA) moves in the northeast direction at 20 km/h.

Then, the communication apparatus 101 (STA) transmits the probe request to the AP (F503). Upon receiving the probe request from the communication apparatus 101 (STA), the AP transmits the probe response to this (F504). This probe response contains the Location Parameters information element and is given moving speed information of the AP. The communication apparatus 101 (STA) that has received the probe response compares the moving speed of the AP included in the probe response with the moving speed of the self apparatus (F505). As a result of comparison, it is decided that connection can be maintained because the communication apparatus 101 (STA) and the AP move at the same speed and in the same direction. The communication apparatus 101 (STA) requests wireless connection to the AP (F506). Once wireless connection processing has completed, the communication apparatus 101 (STA) informs the user of connection success (F507).

Figure 6:
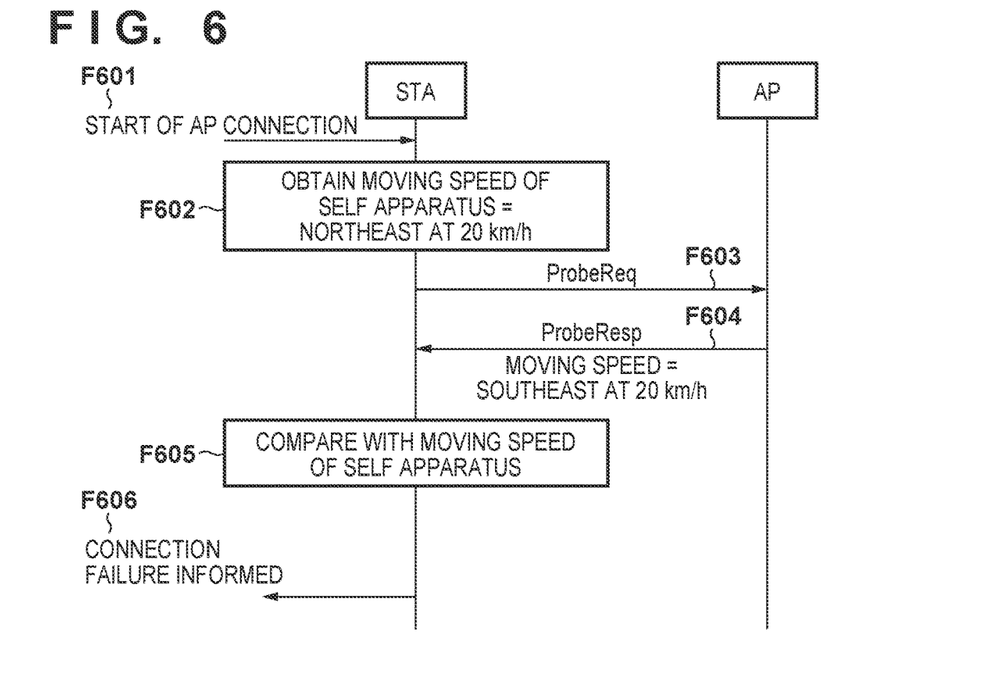
FIG. 6 is the second operation sequence chart according to the first embodiment of the present invention.

Next, FIG. 6 is the second schematic chart showing an operation sequence when the communication apparatus connects to the AP according to this embodiment. In this example, while the communication apparatus 101 (STA) moves in the northeast direction at 20 km/h as in the first schematic chart, the AP moves in the southeast direction at 20 km/h, and thus they are in a situation in which a radio wave no longer reaches soon even if they are connected to each other. In this example, the predetermined value of the speed difference in step S404 of FIG. 4 is set to 5 km/h. However, the predetermined value may be set to a value other than this.

F601 to F604 are the same as F501 to F504 in FIG. 5 and a description thereof will be omitted. The communication apparatus 101 (STA) that has received the probe response compares the moving speed of the AP included in the probe response with the moving speed of the self apparatus (F605). The AP in this sequence moves in the southeast direction at 20 km/h, and thus the magnitude of the relative speed will be about 28 km/h. Since the magnitude of the relative speed exceeds the predetermined value of 5 km/h, the communication apparatus 101 (STA) decides that connection to the AP is inappropriate. Therefore, the communication apparatus 101 (STA) does not connect to the AP and informs the user of a connection failure (F606).

As described above, according to this embodiment, it is possible to prevent connection to the AP with which communication becomes unavailable soon by deciding whether to connect to the AP in consideration of the moving speeds of the communication apparatus 101 (STA) and the AP, thereby improving connectivity.

As described above, since the base station is selected in consideration of the moving states of both the self apparatus and the base station, connection to the base station in an unstable communication state is reduced. This makes it possible to improve connectivity.

Second Embodiment

In this second embodiment, a description will be made of a process of selecting and connecting to an optimal AP when a plurality of APs exist on the periphery of a communication apparatus 101 (STA). Note that the arrangement of the communication apparatus 101 is the same as in the first embodiment.

<1. Network Configuration>

Figure 7:
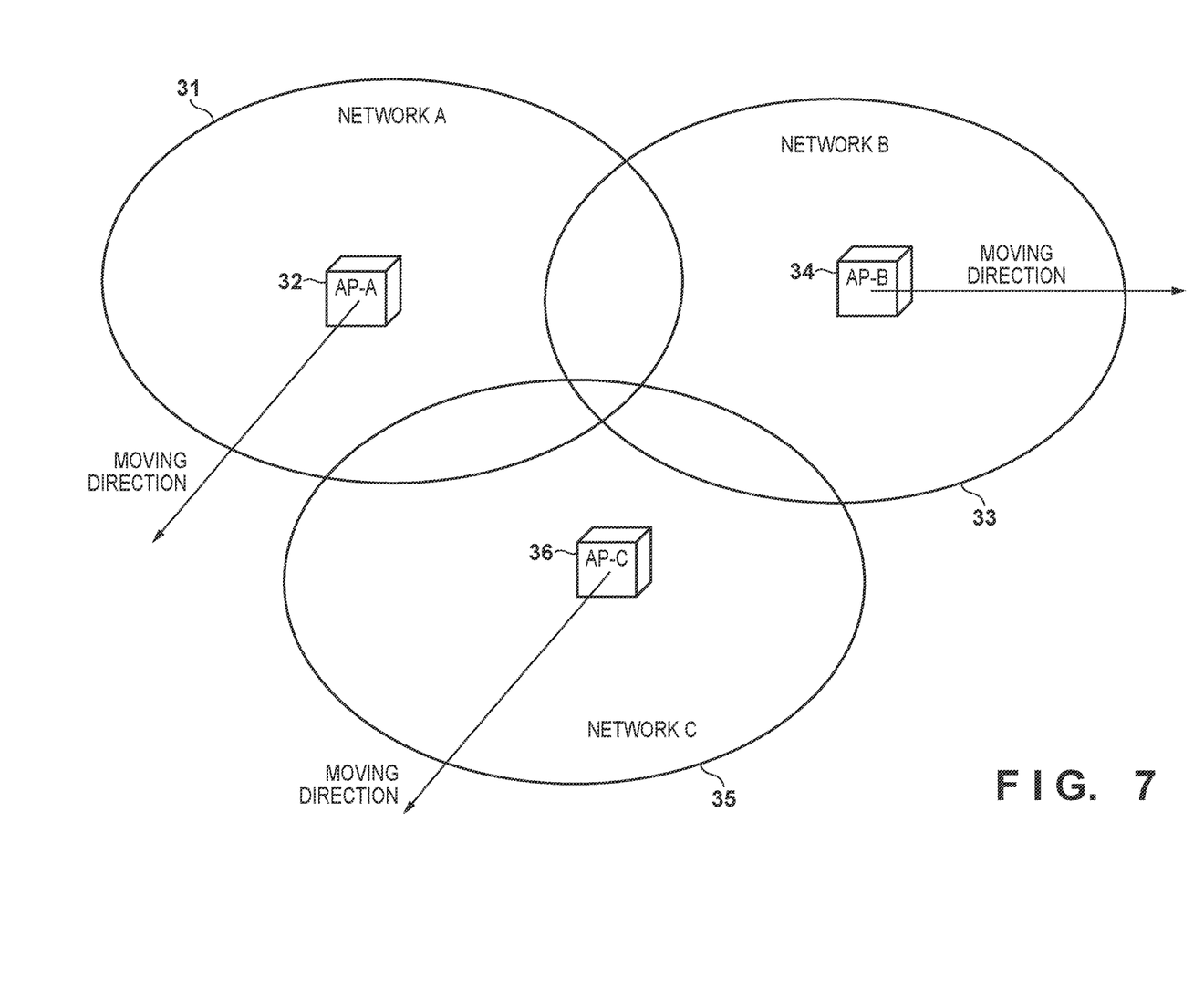
FIG. 7 is a view showing an example of the network configuration to which the second embodiment of the present invention is applied.

FIG. 7 is a view showing an example of the network configuration to which the second embodiment of the present invention is applied. FIG. 7 shows a situation in which three access points of AP-A (AP 32), AP-B (AP 34), and AP-C (AP 36), respectively, form network A (network 31), network B (network 33), and network C (network 35). Each AP moves following a different moving unit or the like. In addition, each AP has a function of giving moving speed information of the self apparatus to a beacon signal, a probe response signal, or the like of a wireless LAN, and notifying of this.

<2. Processing of Communication Apparatus>

Figure 8:
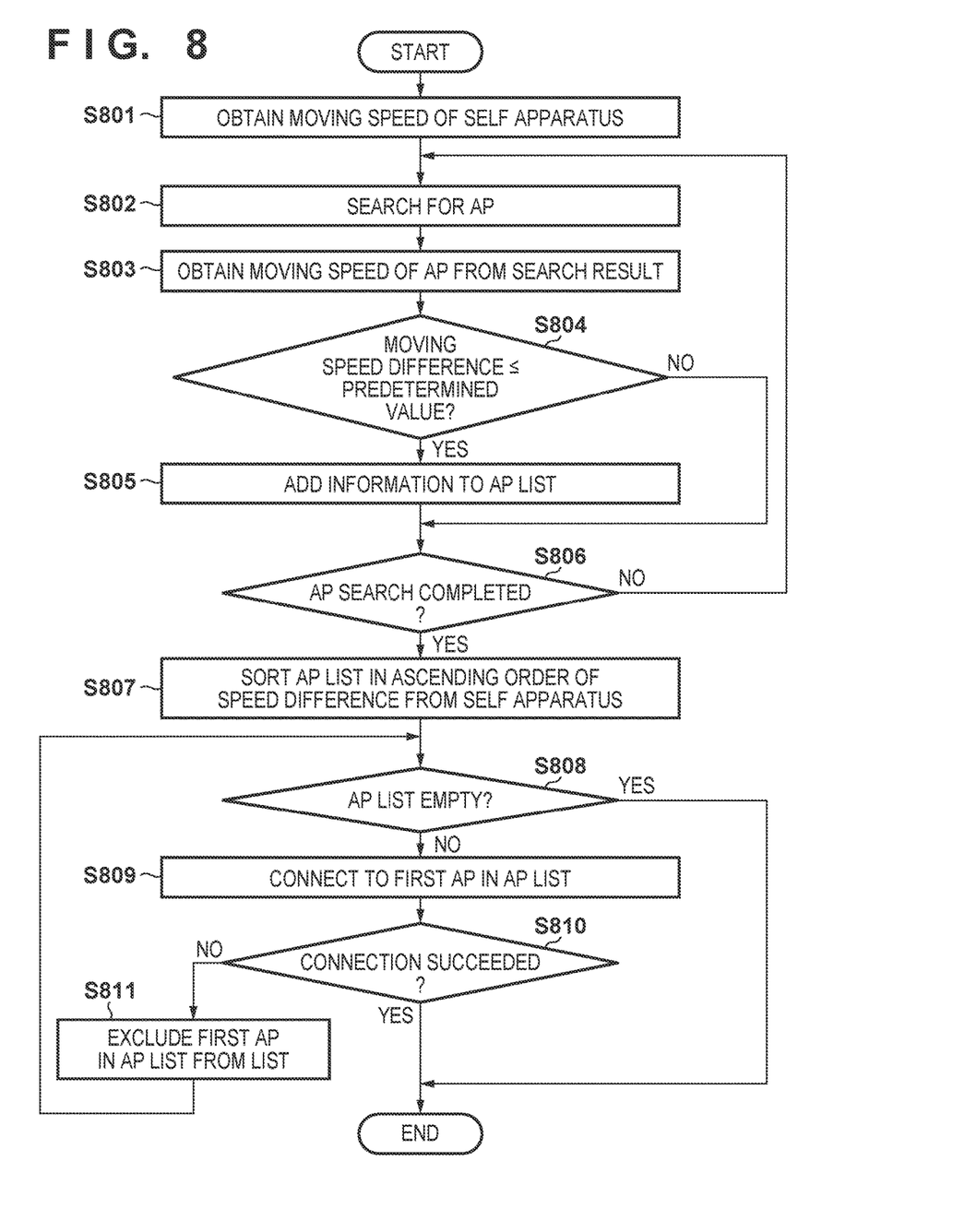
FIG. 8 is a flowchart showing a process procedure executed by a communication apparatus according to the second embodiment of the present invention.

FIG. 8 is a flowchart showing a process procedure executed by the communication apparatus (STA) which implements this second embodiment. Step S801 is the same as step S401 in the first embodiment and a description thereof will be omitted. The communication apparatus 101 (STA) searches for the peripheral AP (step S802). In step S802, the communication apparatus 101 (STA) broadcasts a probe request to each channel of the wireless LAN and waits for a response. Steps S803 and S804 are the same as steps S403 and S404 in the first embodiment, and a description thereof will be omitted.

If it is determined, in step S804, that the difference between the moving speed of the communication apparatus 101 (STA) and the moving speed of the AP is equal to or smaller than a predetermined value (Yes in step S804), that AP information is added to an AP list (step S805). Information saved in the list is, for example, the MAC address, the channel number, the SS ID, and the magnitude of the speed difference from the communication apparatus 101 (STA) of the AP.

On the other hand, if it is determined, in step S804, that the difference between the moving speed of the communication apparatus 101 (STA) and the moving speed of the AP is equal to or larger than the predetermined value (No in step S804), that AP information is not added to the AP list. Then, if it is determined that AP search has not completed yet (No in step S806), the process returns to step S802 to perform search again. On the other hand, if it is determined that AP search has completed (Yes in step S806), the process advances to step S807 and subsequent steps. For example, the communication apparatus 101 (STA) may be configured to decide that AP search has completed after transmitting the probe requests to all the available wireless channels.

Prior to connection processing, the communication apparatus 101 (STA) sorts the APs included in the AP list in ascending order of the speed difference from the communication apparatus 101 (STA) (step S807). If the AP list is not empty (No in step S808), the communication apparatus 101 (STA) attempts to connect to the first AP stored in the AP list (step S809). If connection has succeeded (Yes in step S810), connection processing ends at that point. On the other hand, if connection has failed (No in step S810), the AP on which the attempt at connection has been made is excluded from the AP list (Step S811) and the communication apparatus 101 (STA) attempts to connect to the next AP still in the AP list. If the AP list is empty in step S808 (Yes in step S808), it is determined that the APs suitable for connection no longer exist and connection processing ends.

<3. Operation Sequence>

Figure 9:
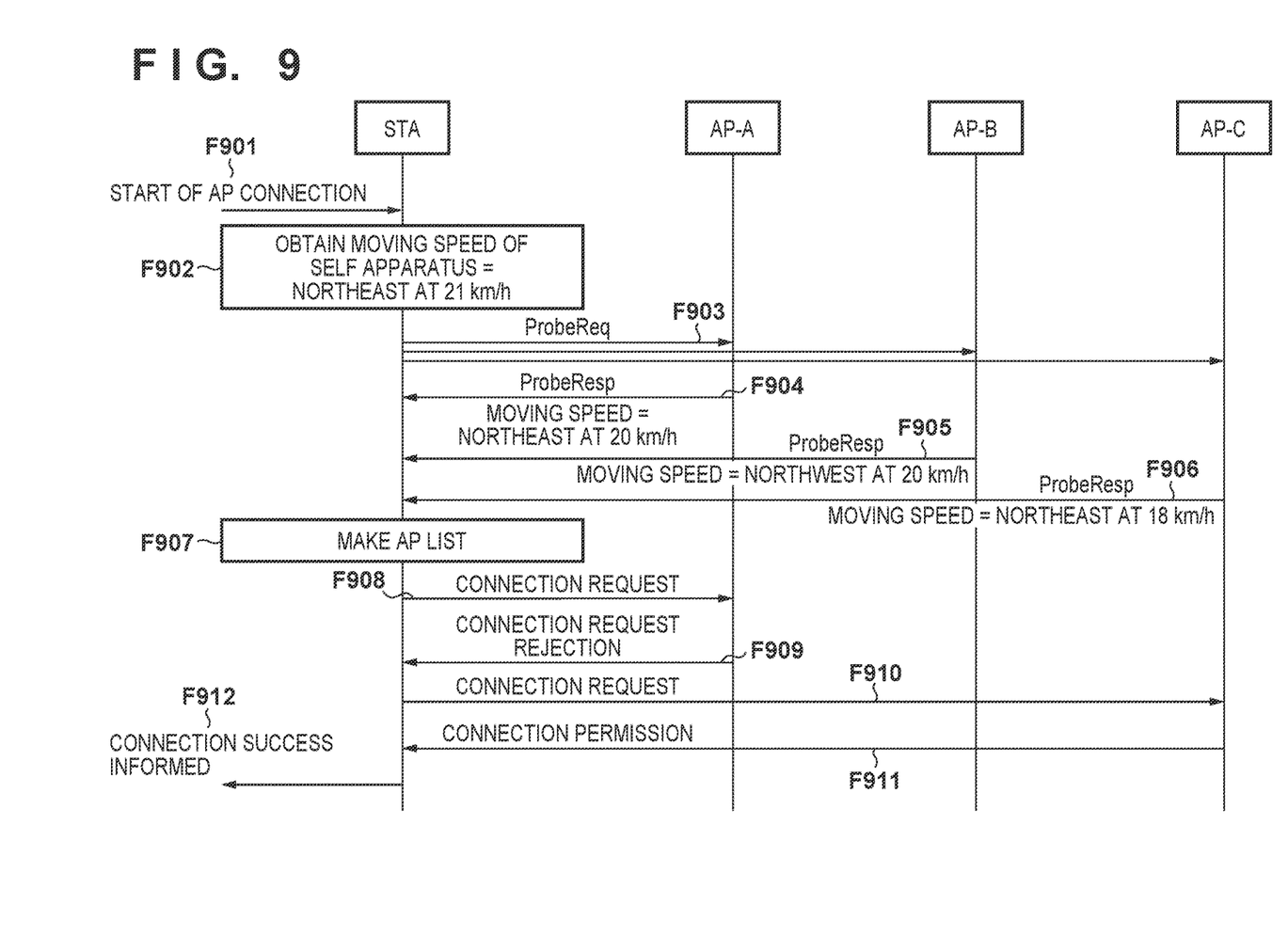
FIG. 9 is an operation sequence chart according to the second embodiment of the present invention.

FIG. 9 is a schematic chart showing an operation sequence when the communication apparatus connects to the APs according to this embodiment. In this example, a case will be exemplified in which when the three APs (AP-A, AP-B, and AP-C) exist around the communication apparatus 101 (STA) and they move at different speeds, the preferred AP is selected and connected.

F901 and F902 are the same as F501 and F502 in the first embodiment, and a description thereof will be omitted. In F903, the communication apparatus 101 (STA) broadcasts a probe request. In F904 to F906, the communication apparatus 101 (STA) receives a probe response from each AP. Each probe response contains moving speed information of each AP. In each step of F904 to F906, the communication apparatus 101 (STA) compares its moving speed with the moving speed of each AP and determines whether a moving speed difference is equal to or smaller than a predetermined value.

Since the communication apparatus 101 (STA) has the speed differences of 1 km/h from AP-A, 28 km/h from AP-B, and 2 km/h from AP-C here, AP-A and AP-C are added to the AP list in this order (F907). AP-B is not added to the AP list because its speed difference is larger than the predetermined value. The communication apparatus 101 (STA) sequentially attempts connection based on thus made AP list. First, the communication apparatus 101 (STA) transmits an Association Request to AP-A at the start of the list and attempts connection (F908).

However, AP-A may reject connection for the reason that, for example, AP-P has already reached the maximum number of connections (F909). In this case, the communication apparatus 101 (STA) attempts to connect to AP-C that is the second AP stored in the AP list (F910). If AP-C permits connection (F911), the communication apparatus 101 (STA) informs the user of connection success (F912).

In this sequence, a case in which AP-C permits connection has been described. However, even if AP-C rejects connection by the communication apparatus 101 (STA) in F911, the communication apparatus 101 (STA) does not request connection to AP-B because it is not stored in the AP list. At this time, the communication apparatus 101 (STA) may inform the user of a connection failure.

As described above, according to this embodiment, when the communication apparatus finds that there exists the plurality of APs each having the speed difference from the self apparatus smaller than the predetermined value, it can connect to the preferred AP by attempting connection in ascending order of the speed difference, improving connectivity. It is also possible to reduce the possibility of connecting to the AP with which communication may become unavailable soon, increasing user convenience.

In the description of the above embodiment, the communication apparatus has used, as the method of searching for the APs, the method of transmitting the probe request and waiting for the responses to it. However, the communication apparatus may use a method of searching for the APs by detecting a beacon transmitted from each AP. Further, a method other than the method described in the above embodiment may be used as a method of calculating the moving speed of the communication apparatus and the moving speed of each AP. A method other than the method described in the above embodiment may also be used as a method of obtaining the speed difference between the communication apparatus and each AP. Note that the aforementioned communication apparatus is, for example, a mobile phone or a smart phone, a wearable terminal, or a digital camera and each of the aforementioned APs is not limited to a mobile router but can be the mobile phone or a smart phone, a wearable terminal, a digital camera, or the like having an AP function.

According to the present invention, it is possible to reduce connection of the communication apparatus to the base station in an unstable communication state and improve connectivity.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-064901, filed Mar. 26, 2015, which is hereby incorporated by reference wherein in its entirety.

What is claimed is:

1. A communication apparatus connectable to a wireless base station, the apparatus comprising:
    a first obtaining unit configured to obtain a moving speed of the communication apparatus;
    a second obtaining unit configured to obtain a moving speed of the wireless base station;
    a control unit configured to control connection to the wireless base station based on the moving speed of the communication apparatus and the moving speed of the wireless base station;
    a search unit configured to search for the wireless base station, and
    a connection unit configured to connect to the wireless base station,
    wherein when the search unit searches for a plurality of wireless base stations, the control unit determines whether a difference between the moving speed of the communication apparatus and a moving speed of each wireless base station is not more than the predetermined value, and
    wherein when there exists the plurality of wireless base stations each having the difference not more than the predetermined value, the connection unit connects to one of the plurality of wireless base station each having the difference not more than the predetermined value.

2. The apparatus according to claim 1, wherein the first obtaining unit obtains the moving speed of the communication apparatus by measuring the moving speed of the communication apparatus.

3. The apparatus according to claim 2, further comprising a position obtaining unit configured to obtain a position of the communication apparatus,
 wherein the first obtaining unit measures the moving speed of the communication apparatus from a history of the position of the communication apparatus periodically obtained by the position obtaining unit.

4. The apparatus according to claim 1, wherein the second obtaining unit obtains the moving speed of the wireless base station based on information obtained by the search unit.

5. The apparatus according to claim 4, wherein the search unit obtains the information by transmitting a probe request to the wireless base station and receiving a probe response from the wireless base station.

6. The apparatus according to claim 5, wherein the information is a Location Parameters information element complying with an IEEE802.11 standard series.

7. The apparatus according to claim 4,
 wherein the control unit determines whether a difference between the moving speed of the communication apparatus and the moving speed of the wireless base station is not more than a predetermined value, and
 the connection unit connects to the wireless base station if the control unit determines that the difference is not more than the predetermined value.

8. The apparatus according to claim 7, wherein the connection unit does not connect to the wireless base station if the control unit determines that the difference is larger than the predetermined value.

9. The apparatus according to claim 1, wherein when there exists the plurality of wireless base stations each having the difference not more than the predetermined value, the connection unit connects to the wireless base station having the smallest difference.

10. The apparatus according to claim 9, wherein the connection unit connects to the wireless base station having the second smallest difference if the connection unit cannot connect to the wireless base station having the smallest difference.

11. A control method of a communication apparatus connectable to a wireless base station, the method comprising:
 obtaining a moving speed of the communication apparatus;
 obtaining a moving speed of the wireless base station;
 controlling connection to the wireless base station based on the moving speed of the communication apparatus and the moving speed of the wireless base station,
 searching for the wireless base station, and
 connecting to the wireless base station,
 determining, when the searching includes searching for a plurality of wireless base stations, whether a difference between the moving speed of the communication apparatus and a moving speed of each wireless base station is not more than the predetermined value, and
 connecting, when there exists the plurality of wireless base stations each having the difference not more than the predetermined value, to one of the plurality of wireless base station each having the difference not more than the predetermined value.

12. A non-transitory computer-readable storage medium storing a computer program for causing a computer to execute a control method of a communication apparatus connectable to a wireless base station, the method comprising:
 obtaining a moving speed of the communication apparatus;
 obtaining a moving speed of the wireless base station;
 controlling connection to the wireless base station based on the moving speed of the communication apparatus and the moving speed of the wireless base station,
 searching for the wireless base station, and
 connecting to the wireless base station,
 determining, when the searching includes searching for a plurality of wireless base stations, whether a difference between the moving speed of the communication apparatus and a moving speed of each wireless base station is not more than the predetermined value, and
 connecting, when there exists the plurality of wireless base stations each having the difference not more than the predetermined value, to one of the plurality of wireless base station each having the difference not more than the predetermined value.

* * * * *